United States Patent
Kim et al.

(10) Patent No.: US 11,769,293 B2
(45) Date of Patent: Sep. 26, 2023

(54) CAMERA MOTION ESTIMATION METHOD FOR AUGMENTED REALITY TRACKING ALGORITHM AND SYSTEM THEREFOR

(71) Applicant: VIRNECT inc., Seoul (KR)

(72) Inventors: Ki Young Kim, Seoul (KR); Benjamin Holler, Wien (KR)

(73) Assignee: VIRNECT CO., LTD., Seoul (KR)

( * ) Notice: Subject to any disclaimer, the term of this patent is extended or adjusted under 35 U.S.C. 154(b) by 0 days.

(21) Appl. No.: 17/992,915

(22) Filed: Nov. 22, 2022

(65) Prior Publication Data

US 2023/0162434 A1     May 25, 2023

(30) Foreign Application Priority Data

Nov. 23, 2021 (KR) .......... 10-2021-0161957
Dec. 31, 2021 (KR) .......... 10-2021-0194396

(51) Int. Cl.
G06T 15/20 (2011.01)
G06T 19/00 (2011.01)
G06T 7/20 (2017.01)
G06T 7/70 (2017.01)

(52) U.S. Cl.
CPC .......... *G06T 15/20* (2013.01); *G06T 7/20* (2013.01); *G06T 7/70* (2017.01); *G06T 19/006* (2013.01); *G06T 2207/30241* (2013.01); *G06T 2207/30244* (2013.01); *G06T 2215/16* (2013.01)

(58) Field of Classification Search
None
See application file for complete search history.

(56) References Cited

U.S. PATENT DOCUMENTS

2012/0314040 A1* 12/2012 Kopf ............... H04N 13/264
                                                348/E13.074
2014/0118339 A1   5/2014  Davies et al.
(Continued)

FOREIGN PATENT DOCUMENTS

JP    2011118724      6/2011
JP    2016517982      6/2016
KR    20070086037     8/2007
(Continued)

OTHER PUBLICATIONS

Koji Makita et al., A prototype tool in TrakMark to generate benchmark data sets for visual tracking methods using virtualized reality models, Center for Service Research, AIST, 2011, Center for Service Research, AIST, Koto City, Japan.
(Continued)

*Primary Examiner* — Frank S Chen
(74) *Attorney, Agent, or Firm* — STIP Law Group, LLC

(57) ABSTRACT

A camera motion estimation method for an augmented reality tracking algorithm according to an embodiment is a camera motion estimation method for an augmented reality tracking algorithm performed by a sequence production application executed by a processor of a computing device, which includes a step of displaying a target object on a sequence production interface, a step of setting a virtual camera trajectory on the displayed target object, a step of generating an image sequence by rendering images obtained when the target object is viewed along the set virtual camera trajectory, and a step of reproducing the generated image sequence.

7 Claims, 6 Drawing Sheets

(56) References Cited

U.S. PATENT DOCUMENTS

2022/0139027 A1* 5/2022 Luo .................... G06N 3/045
  345/418
2022/0406003 A1* 12/2022 Cayon .................. G06T 19/00

FOREIGN PATENT DOCUMENTS

| KR | 20200044714 | 4/2020 |
| KR | 102110123 | 5/2020 |
| KR | 20200067882 | 6/2020 |
| KR | 102246010 | 4/2021 |
| KR | 102282730 | 7/2021 |

OTHER PUBLICATIONS

Koji Makita et al., Virtualized reality model-based benchmarking of AR/MR camera tracking methods in TrakMark, Center for Service Research, AIST, 2012, Center for Service Research, AIST, Koto City, Japan.

The extended European search report of EP 22 20 8878, dated May 8, 2023.

Kyel Ok et al., Simultaneous Tracking and Rendering: Real-time Monocular Localization for MAVs, IEEE International Conference on Robotics and Automation, May 2016, pp. 4522-4529, IEEE, Piscataway, United States.

* cited by examiner

[Fig. 1]
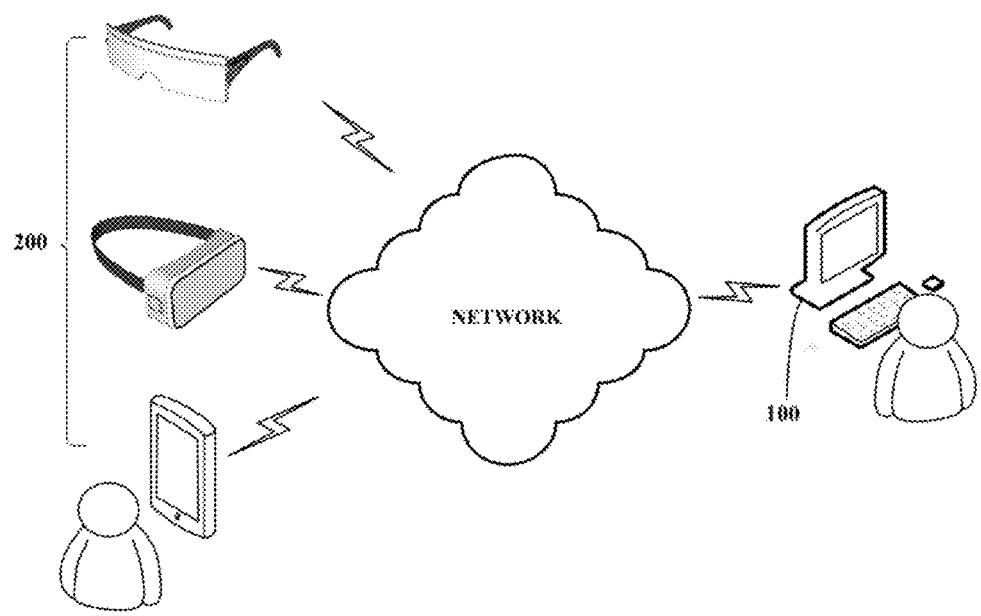

[Fig. 2]
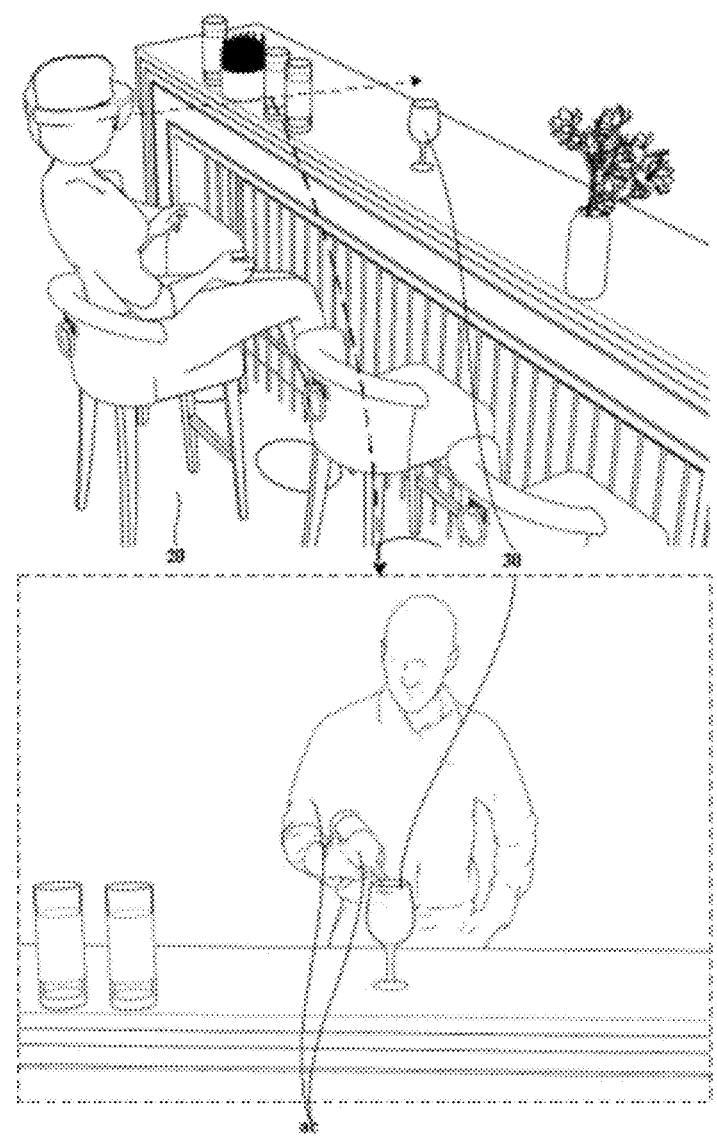

[Fig. 3]
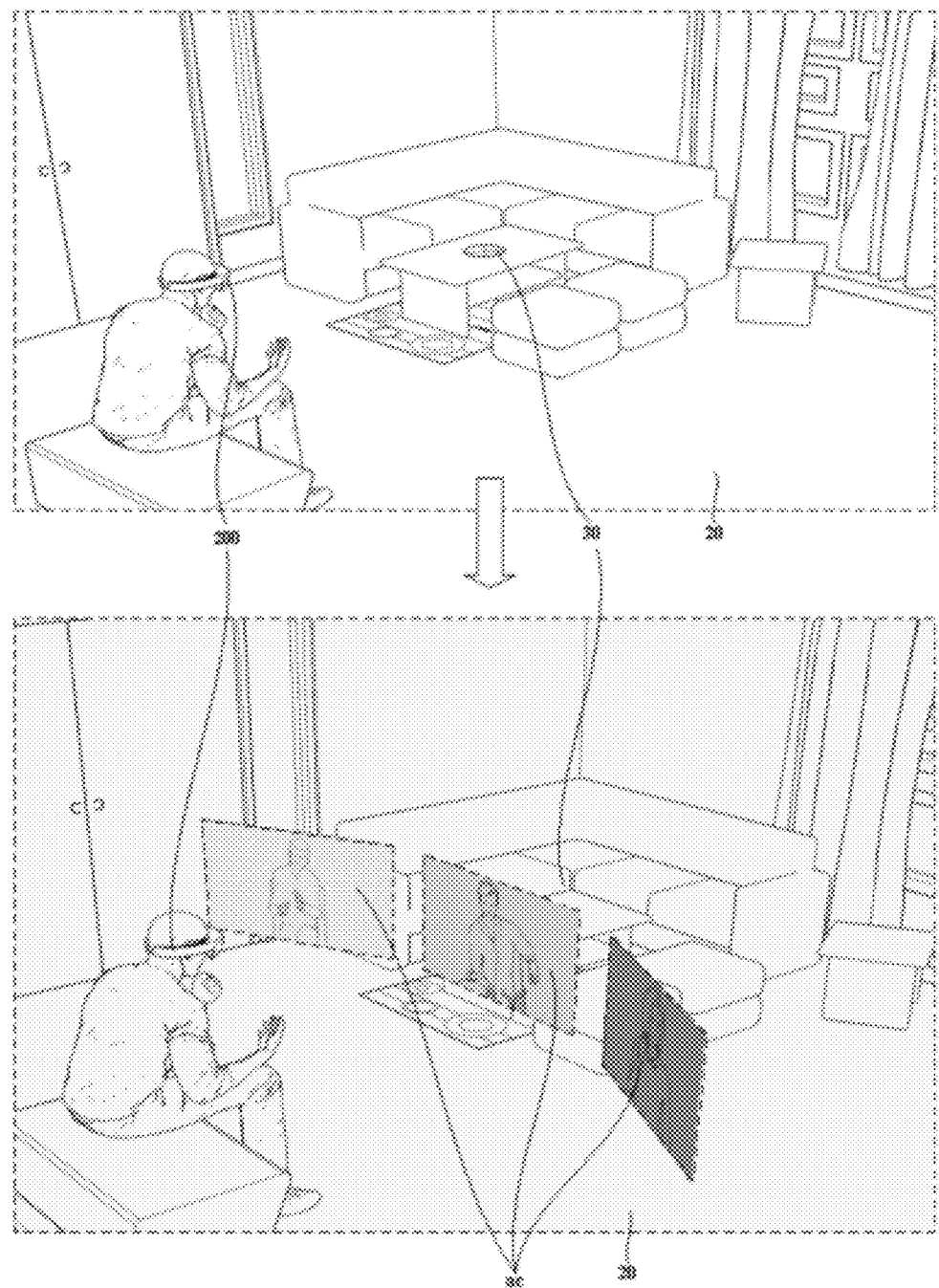

[Fig. 4]
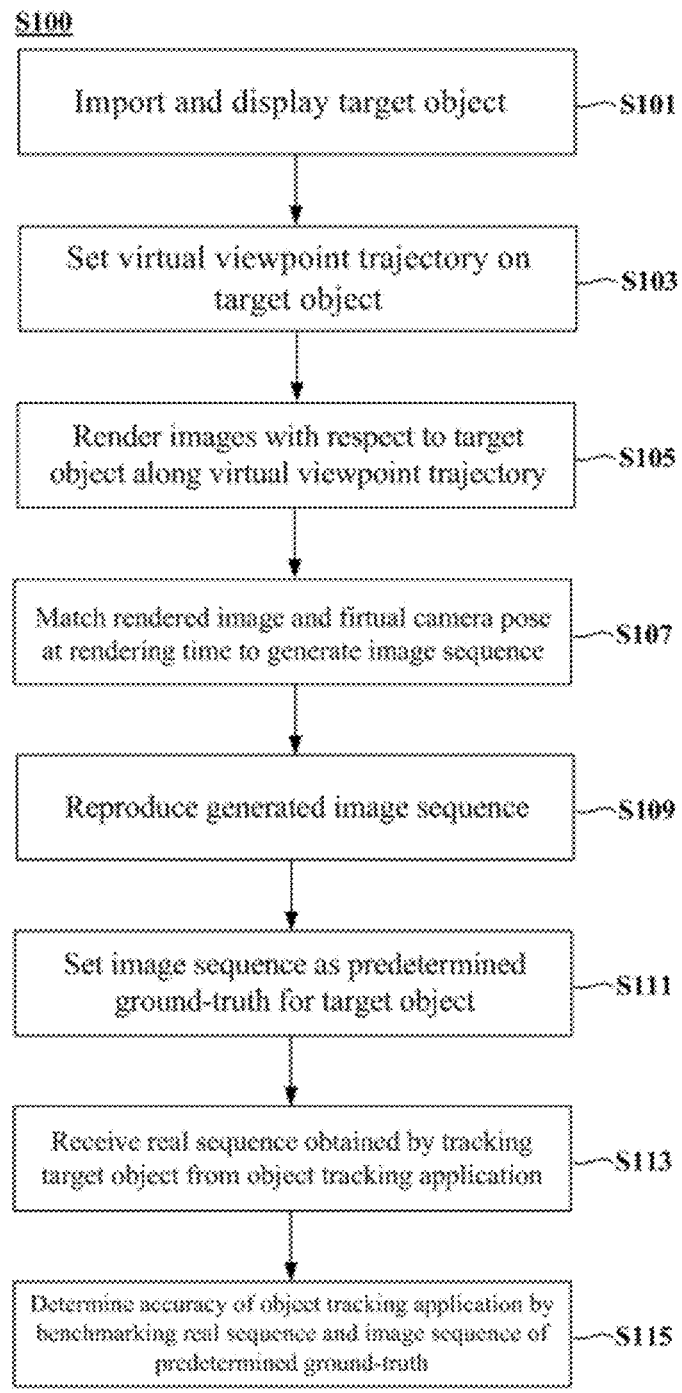

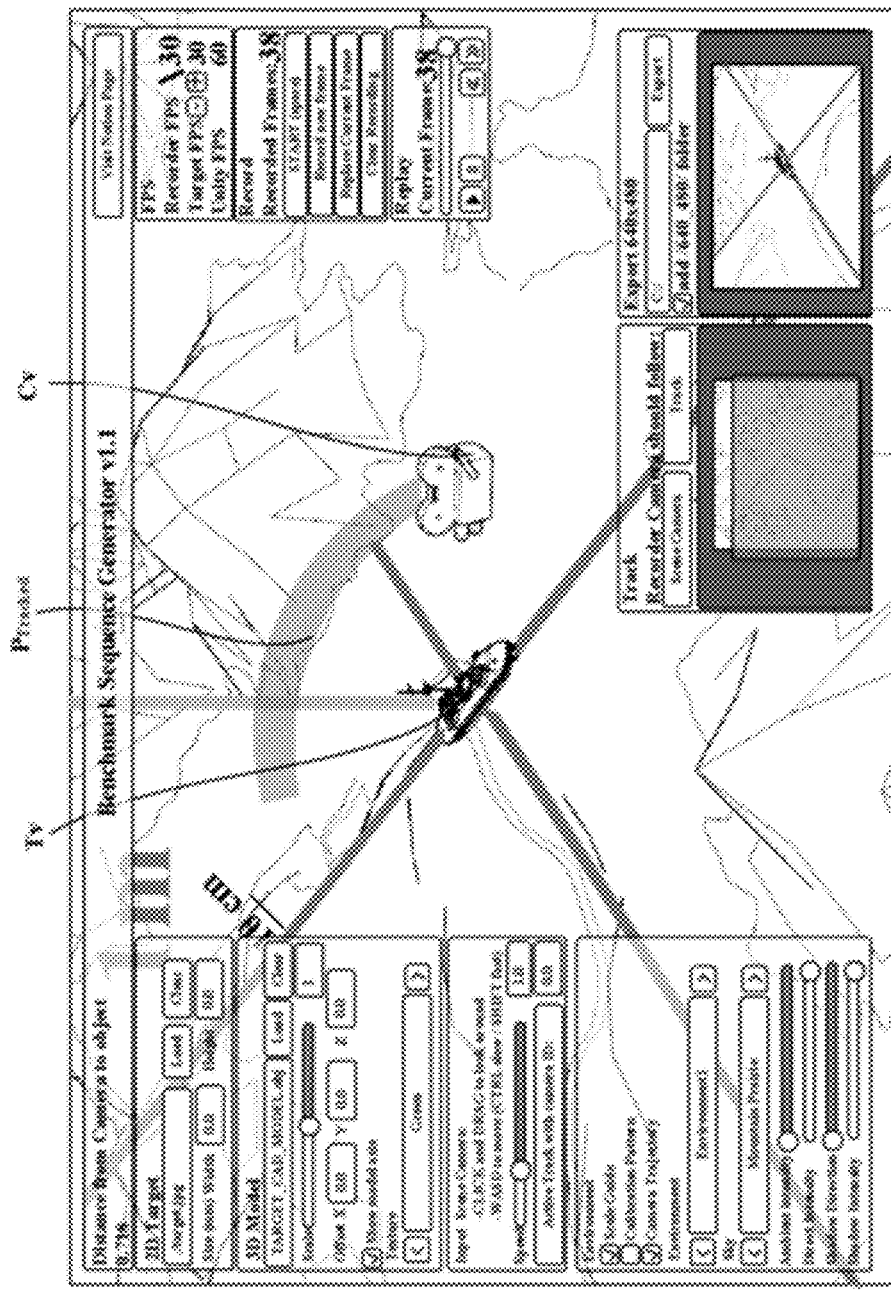
[FIG. 5]

[Fig. 6]
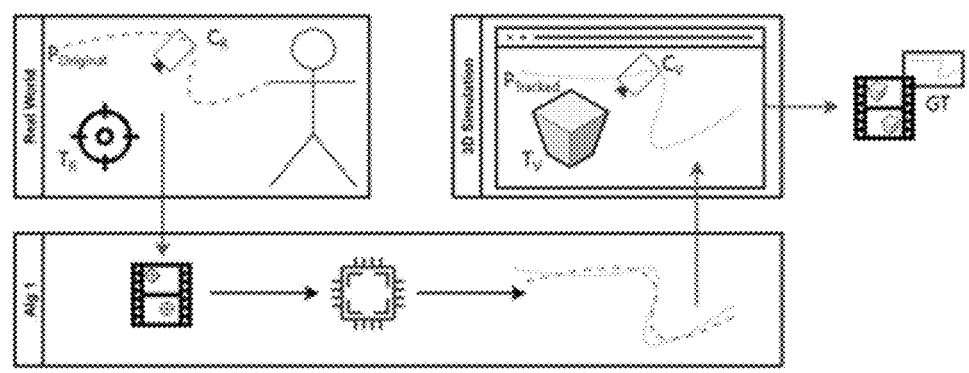

CAMERA MOTION ESTIMATION METHOD FOR AUGMENTED REALITY TRACKING ALGORITHM AND SYSTEM THEREFOR

CROSS-REFERENCE TO RELATED APPLICATIONS

This application claims the benefit of Korean Patent Provisional Application No. 10-2021-0161957, filed on Nov. 23, 2021, and Korean Patent Application No. 10-2021-0194396, filed on Dec. 31, 2021, in the Korean Intellectual Property Office, the entire disclosure of which is incorporated herein by reference for all purposes.

TECHNICAL FIELD

The present disclosure relates to a camera motion estimation method and system for an augmented reality tracking algorithm. Specifically, the present disclosure relates to a method of estimating a virtual camera motion with respect to an image sequence of a predetermined ground-truth that is a benchmark in an object tracking algorithm.

BACKGROUND

Augmented Reality (AR) refers to adding a live video feed, for example, to the perception of a real-world view by superimposing virtual objects or media on the real-world view.

Such AR enables artificial or simulated information related to a real-world and objects thereon to be overlaid on a real-world view. AR is different from but related to virtual reality (VR), in which VR replaces a real-world view with an artificial or simulated view. AR has been used in applications such as entertainment, video games, sports, and mobile phone applications.

In various AR systems, a tracking system is used to track the positions and orientations of various real-world objects and cameras in a 3D space.

For example, the tracking system may track a real object in an image captured/viewed by a camera. Various AR systems may attempt to create an augmented scene including a real-world scene (including various real-world objects) as captured by a camera and an overlaid virtual medium and/or objects.

To create an augmented scene, the tracking system may generate a virtual coordinate frame in which it may track or "place" representations of real-world objects.

Various AR systems may attempt to "place" various virtual objects (e.g., CAD models/objects) in a coordinate frame to create an augmented scene. Virtual objects/models may have their own default or arbitrary reference frames (e.g., 3D positions and orientations) to be placed in the coordinate frame of the tracking system, and mapping or transform between the coordinate frame of the tracking system and the virtual object reference frames need to be determined.

Moreover, as a camera (e.g., a camera that captures real-world scenes) moves, an AR system may attempt to change views of virtual objects. To perform this with precision, the AR system may need to track the position and orientation of the camera.

It can be ascertained that accurate augmentation is achieved only when a camera and the pose (e.g., position and posture) of a real object are detected and tracked at a time at which the camera captures the real object in order to implement AR as described above.

Therefore, various object tracking applications for tracking real objects are being developed, and as various object tracking applications are installed and driven in various environments and various terminals, it is necessary to determine whether tracking of real objects is performed accurately according to various parameter conditions.

SUMMARY

In order to determine whether object tracking is performed accurately in an object tracking application, data obtained by capturing a real object and tracking the pose of the real object using the object tracking application and a predetermined ground-truth for benchmarking are required.

An object of the present invention is to provide a camera motion estimation method and system for an augmented reality tracking algorithm for generating an image sequence serving as a benchmark.

In addition, another object of the present invention is to provide a camera motion estimation method and system for an augmented reality tracking algorithm which generate a trajectory of a virtual camera for generating an image sequence serving as a benchmark.

Another object of the present invention is to provide a camera motion estimation method and system for an augmented reality tracking algorithm which evaluate the accuracy of an object tracking algorithm using a generated image sequence and improve tracking performance by modifying parameters.

A camera motion estimation method for an augmented reality tracking algorithm according to an embodiment is a camera motion estimation method for an augmented reality tracking algorithm performed by a sequence production application executed by a processor of a computing device, including displaying a target object on the sequence production interface, setting a virtual viewpoint trajectory on the displayed target object, generating an image sequence by rendering images obtained when the target object is viewed along the set virtual viewpoint trajectory, and reproducing the generated image sequence.

Here, the displaying the target object on the sequence production interface may include importing a pre-designed 3D model corresponding to the target object, and placing the imported 3D model at an origin of 3D spatial coordinates.

Further, the setting the virtual viewpoint trajectory on the displayed target object may include placing a virtual camera according to a user input through the sequence production interface, moving the placed virtual camera, and setting a trajectory of movement of the virtual camera as the virtual viewpoint trajectory.

Further, the setting the virtual viewpoint trajectory on the displayed target object may include receiving a real viewpoint trajectory generated by photographing and tracking a real object from a camera device, generating a virtual viewpoint trajectory corresponding to the real viewpoint trajectory, and setting the generated virtual viewpoint trajectory as the virtual viewpoint trajectory for the target object.

Further, the receiving the real viewpoint trajectory generated by photographing and tracking the real object from the camera device may include photographing the real object by the camera device while moving the camera device, calculating, by a real camera of the camera device, a pose value for the real object for each viewpoint at which the real object is photographed, and determining a real viewpoint trajectory including changes of the pose value of the real camera.

Further, the generating the virtual viewpoint trajectory corresponding to the real viewpoint trajectory may include converting the pose value of the real camera for the real object into a pose value of the virtual camera for the target object.

Further, the generating the image sequence by rendering images obtained when the target object is viewed along the set virtual viewpoint trajectory may include moving the virtual camera along the virtual viewpoint trajectory, and generating a frame image by rendering a frame image obtained when the target object is viewed from a virtual camera pose at one viewpoint of the moving virtual camera.

Further, the generating the image sequence by rendering images obtained when the target object is viewed along the set virtual viewpoint trajectory may include matching a virtual camera pose value at the time of capturing each of the rendered frame images and the corresponding frame image and including the matched virtual camera pose value and the frame image in a virtual image sequence.

Further, the camera motion estimation method for an augmented reality tracking algorithm may further include setting the generated virtual image sequence as a predetermined ground-truth serving as a benchmark.

Further, the camera motion estimation method for an augmented reality tracking algorithm may further include receiving a real image sequence obtained by photographing and tracking a real object corresponding to the target object from an object tracking application of a terminal, and comparing the received real image sequence with the predetermined ground-truth to calculate an accuracy parameter of the object tracking application.

A camera motion estimation method and system for an augmented reality tracking algorithm according to an embodiment of the present invention can rapidly and accurately generate an image sequence serving as a benchmark.

In addition, the camera motion estimation method and system for an augmented reality tracking algorithm according to an embodiment of the present invention can realistically generate a motion (trajectory) of a virtual camera for generating an image sequence serving as a benchmark like a real camera motion.

In addition, the camera motion estimation method and system for an augmented reality tracking algorithm according to an embodiment of the present invention can evaluate the accuracy of an object tracking algorithm using a generated image sequence and improve tracking performance by modifying parameters.

BRIEF DESCRIPTION OF THE DRAWINGS

FIG. 1 is an exemplary block diagram of a camera motion estimation system for an augmented reality tracking algorithm.

FIGS. 2 and 3 illustrate that a camera device tracks and recognizes a real object in a real environment and a user checks a screen displayed by matching augmented content with the real object through the camera device.

FIG. 4 is a flowchart of a camera motion estimation method for an augmented reality tracking algorithm according to an embodiment of the present invention.

FIG. 5 shows an example of a user interface of a program for generating an image sequence according to an embodiment of the present invention.

FIG. 6 schematically shows the concept of generating a virtual viewpoint trajectory according to an embodiment of the present invention.

DETAILED DESCRIPTION

The present invention can be modified in various manners and can have various embodiments and thus specific embodiments will be illustrated in the drawings and described in detail in the detailed description. Effects and features of the present invention and a method for achieving the same will become apparent with reference to the embodiments described below in detail in conjunction with the drawings. However, the present invention is not limited to the embodiments described below and may be implemented in various forms. In the following embodiments, terms such as "first" and "second" are used for the purpose of distinguishing one component from another, not in a limiting sense. Further, the singular expression includes the plural expression unless the context clearly dictates otherwise. In addition, terms such as "include" and "have" means that features or components described in the specification are present and do not preclude the possibility that one or more other features or components will be added. In addition, in the drawings, the size of a component may be exaggerated or reduced for convenience of description. For example, since the size and thickness of each component shown in the drawings are arbitrarily indicated for convenience of description, the present invention is not necessarily limited to the illustration.

Hereinafter, embodiments of the present invention will be described in detail with reference to the accompanying drawings, and the same or corresponding components are given the same reference numerals, and redundant description thereof will be omitted.

FIG. 1 is an exemplary block diagram of a camera motion estimation system for an augmented reality tracking algorithm, and FIGS. 2 and 3 illustrate that a camera device tracks and recognizes a real object in a real environment and a user checks a screen displayed by matching augmented content with the real object through the camera device.

Referring to FIGS. 1 to 3, a system 10 according to an embodiment of the present invention may include a computing device 100 and a camera device 200.

Computing Device 100

In the computing device 100 according to an embodiment of the present invention, a sequence production application for generating an image sequence may be installed, and a benchmarking application for calculating accuracy by benchmarking data (e.g., a sequence according to a viewpoint trajectory) obtained by tracking a target object through an object tracking application using the generated image sequence as a predetermined ground-truth may be installed.

In addition, the sequence production application may provide an environment for creating drawings of 3D models of various objects, and an environment for creating and editing content such as various augmented models or various types of information for various objects. The sequence production application may provide various tools for drawing various types of content, but is not limited thereto and may include mechanisms for importing existing files including images, 2D or 3D objects.

Various software developer kits (SDKs) or library-type ToolKit can be applied to the sequence production application.

The computing device 100 may be a mobile device such as a smartphone or a tablet PC in which an application is installed. For example, the computing device 100 may include a smartphone, a mobile phone, a digital broadcasting device, personal digital assistants (PDAs), a portable multimedia player (PMP), a tablet PC, and the like.

However, according to an embodiment, the computing device 100 may include a desktop type computing device. Here, the desktop type computing device 100 may include devices in which a program for executing a map target tracking service based on wired/wireless communication is installed, such as fixed desktop PCs in which an application is installed and personal computers such as a laptop computer and an ultrabook.

Further, in an embodiment, the computing device 100 may further include a predetermined server computing device that provides an environment for generating an image sequence or an environment for benchmarking.

The computing device 100 may include a memory, a processor assembly, a communication processor, an interface, an input system, and a display system.

Specifically, an application is stored in the memory, and the application may store any one or more of various application programs, data, and commands for generating an image sequence.

For example, the memory may be various storage devices such as a ROM, an EPROM, a flash drive, and a hard drive and may include a web storage that executes a storage function of the memory on the Internet.

The processor assembly may include at least one processor capable of executing instructions of an application stored in the memory to perform various operations for generating an image sequence.

Such a processor assembly may be a system-on-chip (SOC) suitable for a computing device including a central processing unit (CPU) and/or a graphics processing unit (GPU), may execute an operating system (OS) and/or application programs stored in the memory, and may control each component mounted on the computing device.

In addition, the processor assembly may include at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electrical units for executing other functions.

The communication processor may include one or more devices for communicating with an external device. Such a communication processor may perform communication via a wireless network.

Specifically, the communication processor 130 may communicate with a device including a predetermined camera to generate an image sequence and may communicate with various user input components such as a controller for receiving user input.

Such a communication processor may wirelessly transmit/receive data to/from at least one of a base station, an external computing device, and an arbitrary server on a mobile communication network constructed through communication devices capable of performing a communication method for mobile communication (e.g., Long Term Evolution (LTE), Long Term Evolution-Advanced (LTE-A), 5G New Radio (NR), Wi-Fi, or short-range communication) according to technical standards for mobile communication.

The interface may connect the computing device to one or more other devices such that the computing device can communicate therewith. Specifically, the interface may include a wired and/or wireless communication device compatible with one or more different communication protocols.

The computing device may be connected to various input/output devices through this interface. For example, the interface may be connected to an audio output device such as a headset port or a speaker to output audio.

For example, the interface may be connected to an input device such as a keyboard and/or a mouse to obtain user input. Although a keyboard and/or a mouse are connected through the interface in the above description, embodiments in which a keyboard and/or a mouse are installed inside the computing device may also be provided.

Such an interface may include at least one of a wired/wireless headset port, an external charger port, a wired/wireless data port, a memory card port, a port for connecting a device equipped with an identification module, an audio input/output (I/O) port, a video I/O port, an earphone port, a power amplifier, an RF circuit, a transceiver, and other communication circuits.

The input system may detect user input (e.g., a gesture, a voice command, operation of a button, or other types of input). Specifically, the input system may include a predetermined button, a touch sensor and/or an image sensor for receiving user motion input.

Further, the input system may be connected to an external controller through the interface to receive user input.

The display system may output various types of information such as an image sequence as a graphic image.

Such a display system may include at least one of a liquid crystal display (LCD), a thin film transistor liquid crystal display (TFT LCD), an organic light-emitting diode (OLED), a flexible display, a 3D display, and an e-ink display.

Camera Device 200

The camera device 200 may be a terminal including a camera that senses an image by photographing the area around the camera device 200.

An object tracking application for tracking an object may be installed in the camera device 200, and the object tracking application may provide an augmented reality environment by controlling augmented content to match and be displayed on a tracked object.

The camera device 200 may be a mobile-type terminal capable of changing a viewpoint of a camera by a user. For example, the camera device 200 may include a smartphone, a mobile phone, a digital broadcasting device, personal digital assistants (PDA), a portable multimedia player (PMP), a tablet PC, and the like.

In addition, the camera device 200 may include a head mounted display (HMD) by which a user wearing the device and immersed in augmented and/or virtual reality environments can navigate the virtual environment and interact with the virtual environment through various different types of inputs.

In some embodiments, the camera device 200 may be a commercial product such as HoloLens of MicroSoft, Meta1/Meta2 Glass of Meta, Google Glass of Google, MD-10 of Cannon, or Magic Leap One Creator Edition of Magic Leap, or may be a device providing the same or similar functions.

As shown in FIG. 2, when the object tracking program of the camera device 200 detects a target object 30, the object tracking program may call augmented content ac stored in a database, the computing device 100, other servers, or a memory, match the augmented content ac with the target object 30, render and augment the same, and adjust event flags such that a stored interaction event can be operated.

At this time, it is possible to observe an augmented virtual model or other various types of virtual information in various aspects and different sizes by matching the augmented content ac with the target object 30 based on the matching relationship between the augmented content ac and the target object according to the pose of the target object 30 depending on the angle at which the camera of the camera device 200 observes the target object 30 and the observation distance. Accordingly, the camera device 200 can display various types of information related to the target object 30 through the augmented content ac.

In various embodiments, the user may operate the augmented content ac displayed on the camera device 200 by operating the camera device 200.

In various embodiments, the object tracking program may provide an interface by which the user can observe the augmented content ac sufficiently and closely by moving, rotating, enlarging, and reducing the displayed augmented content ac in the x, y, and z axes.

Hereinafter, a method in which the system generates an image sequence for a target object and evaluates the object tracking accuracy of an object tracking application through the image sequence will be described in detail.

Camera Motion Estimation Method for Augmented Reality Tracking Algorithm

In order to determine the accuracy of tracking a pose of a 3D target object, an object tracking application may acquire a sequence according to a real viewpoint trajectory by photographing the target object along the viewpoint trajectory according to movement of the viewpoint of a camera and calculate the accuracy by comparing the sequence according to the real viewpoint trajectory and a predetermined ground-truth (GT).

Since the amount of benchmark datasets increases as the number of predetermined GTs close to an ideal value increases, more precise accuracy evaluation can be performed for sequences according to various real viewpoint trajectories, and the tracking accuracy can also be improved by modifying parameters of the object tracking application through precise accuracy evaluation.

The terms "pose," "viewpoint trajectory," "image sequence," and "target object" are used throughout this specification, and the term "pose" refers to "position and orientation" and may indicate a 3D position (e.g., X, Y, and Z coordinates) and a 3D orientation (e.g., roll, pitch, and yaw) in a 3D space, that is, 6 degrees of freedom (6 DOF).

The term "camera pose" may refer to a relative position and orientation with respect to a target object that is a detection and tracking target in a 3D space. In an embodiment, when the target object is the origin of 6 DOF, the 6 DOF of the camera may be defined as a camera pose.

Further, "viewpoint trajectory" means a path of a camera pose, a camera pose is changed depending on a camera trajectory, and an image sequence may be obtained by photographing (or rendering) a target object.

When "viewpoint trajectory" is defined as a line, it may mean a camera pose value on a line that is changed for each interval of frame images constituting an image sequence.

In an embodiment, a viewpoint trajectory is set as a line, a camera pose value at a viewpoint at which a camera moving along the line views a target object is determined according to frames per second (FPS), and an image sequence may be formed by matching the camera pose value with a frame image obtained by viewing the target object at one camera pose value.

An "image sequence" may be composed of scenes (e.g., frame images) obtained by the camera viewing the target object according to a camera pose value for each frame capture time while moving along a viewpoint trajectory.

In an embodiment, a "virtual image sequence" may be generated by rendering frame images (e.g., 2D images) obtained by a virtual camera viewing a target object while moving along a virtual viewpoint trajectory and changing a virtual camera pose, and a virtual camera pose value at each frame image capture time may be matched to each frame image and stored. Here, rendering means converting a scene when the target object is viewed at one pose of the virtual camera into a 2D image.

In an embodiment, a "real image sequence" may be generated by rendering frame images (e.g., 2D images) obtained by a real camera viewing a target object while moving along a real viewpoint trajectory and changing a real camera pose, and a real camera pose value at each frame image capture time may be matched to each frame image and stored.

A "target object" may include an object that is a detection and tracking target. For example, a 3D model created in CAD, a real object model obtained by photographing and 3D modeling a real object, a model composed of feature points by photographing and learning a real object, and 2D identification code (e.g., QR code, etc.).

Further, the "target object" may include a virtual object that is augmented by matching on a tracked object. For example, it may include 3D augmented content to be augmented on an object that is created and tracked in CAD.

FIG. 4 is a flowchart of a camera motion estimation method for an augmented reality tracking algorithm according to an embodiment of the present invention, FIG. 5 shows an example of a user interface of a program for generating an image sequence according to an embodiment of the present invention, and FIG. 6 schematically shows the concept of generating a virtual viewpoint trajectory according to an embodiment of the present invention.

Hereinafter, a method in which a sequence production application executed in the processor of the computing device 100 generates a virtual image sequence and benchmarks a real image sequence based on the virtual image sequence to calculate the object tracking accuracy of the camera device 200 will be described in detail with reference to FIGS. 4 to 6.

First, the sequence production application may import a target object into the application and display the same on a sequence production interface (GUI) (S101).

The displayed target object may be, for example, a model produced through a CAD as a 3D model.

Further, the sequence production application may call and display a pre-stored target object.

According to some embodiments, the target object may be created on another computer-aided design (CAD) program. In addition, the sequence production application may import and display a target object or a 2D image created on another CAD program.

Referring to FIG. 5, the target object to be loaded may be determined by designating a path to a file with respect to the target object through 3D model affordance of the sequence production interface (GUI) provided by the sequence production application, and the determined target object may be displayed on the origin of a three-dimensional space.

Next, the sequence production application may set a virtual viewpoint trajectory for the displayed target object (S103).

The sequence production application may set a virtual viewpoint trajectory for creating a virtual image sequence by rendering the target object.

In one embodiment, the sequence production application may place a virtual camera at a position in the 3D space according to a user input through the sequence production interface and then move the virtual camera to set the moving path of the virtual camera as a virtual viewpoint trajectory.

For example, a user may manually input a virtual viewpoint trajectory by moving the virtual camera by operating a direction key on a keyboard or dragging a mouse through the sequence production interface.

In this case, the user may adjust the moving speed of the virtual camera according to an input in the sequence production interface.

For example, the virtual camera may be moved on the X-Y plane through the direction key and moved up and down on the Z axis through two other keys to change pose values of the virtual camera, thereby setting a virtual viewpoint trajectory.

As for the virtual viewpoint trajectory generated as described above, a virtual camera pose value at the time of rendering each frame image can be accurately designed.

The sequence production application may set various parameters for generating a virtual sequence image as well as a virtual viewpoint trajectory on the sequence production interface.

Referring to FIG. 5, by adjusting the scale of the target object as well as the file path of the target object in the 3D model, the scale may be adjusted such that the displayed target object represents the size of the corresponding real object.

In addition, by moving the displayed target object in the 3D space or aligning the posture, the target object may be corrected to be positioned on the origin of the 3D space, or another predefined texture may be set.

A scale guide that can be deactivated in a scene rendered at a virtual viewpoint may be changed (to fit a full-scale 3D model) through the sequence production interface.

Additionally, the sequence production interface may modify parameters for standardized camera calibration patterns and toggle visualization of viewpoint trajectories.

In addition, rendering may be performed in various manners by selecting predefined backgrounds and 3D environments through the sequence production interface. For example, scene-specific lighting and shadow operation may also be adjusted.

Further, a target FPS for recording may be set using an FPS controller through the sequence production interface. Although the operation of the virtual camera moving in the sequence production interface may be executed at 200 FPS, a rendering FPS for image sequences can be set to 15. FIG. 6 shows virtual viewpoint trajectory (P Tracked) frame rate.

In addition, the sequence production interface may include START/STOP buttons to start/stop recording of an image sequence.

When recording is activated, the sequence production application may generate a virtual image sequence by moving the virtual camera according to definition of a virtual viewpoint trajectory and recording (rendering) the target object at a preset frame rate.

To export a virtual image sequence created in the sequence production interface, the virtual image sequence may be generated as a file by designating a path and clicking Export.

A virtual camera pose at each frame image rendering time may be matched and stored in such a virtual image sequence.

For example, the virtual image sequence may include data in the CSV format representing virtual camera poses, frame images, and data in the Json format for matching the frame images and the virtual camera poses.

For a virtual viewpoint trajectory manually designed by the user through the sequence production interface, as described above, the movement of the virtual camera needs to be manually specified. In addition, a manually designed virtual viewpoint trajectory may not represent the realistic movement of a real viewpoint trajectory captured by a real camera while moving in a real environment.

In another embodiment, the sequence production application may set a virtual viewpoint trajectory based on a real viewpoint trajectory along which the camera device photographs a real object.

Specifically, referring to FIG. 5, the user may determine a real object to be photographed by the camera device through a 2D target part in the sequence production interface. In this case, it is preferable that the real object be an object that is easy to track, such as 2D identification code or a pre-trained 2D image.

In addition, the user may track the real object by photographing the determined real object while moving the camera through the object tracking application of the camera device 200. The object tracking application may calculate real camera pose values in frame images of images captured by tracking the real object, and generate changes in camera pose values according to the movement of the camera as a real viewpoint trajectory.

The sequence production application may receive the real viewpoint trajectory from the camera device 200, generate a virtual viewpoint trajectory corresponding to the received real viewpoint trajectory, and display the same on the sequence production interface.

That is, referring to FIG. 6, when a user photographs a real target object $T_R$ while moving the camera $C_R$ of the camera device 200, the object tracking application may track the real target object $T_R$ in a captured image to calculate a real camera pose and generate a real viewpoint trajectory $P_{original}$ indicating changes in calculated real camera pose values. In addition, a real image sequence in which a frame image of the captured image and the real camera pose are matched may also be generated.

The sequence production application (3D simulation) may obtain the real viewpoint trajectory $P_{original}$ and generate a virtual viewpoint trajectory $P_{Tracked}$ of the virtual camera $C_v$ for the target object $T_v$ based thereon. For example, a trajectory creation module Alg 1 of the sequence production application may convert pose change values of the real camera with respect to the real object into pose change values of the virtual camera with respect to the target object to generate the virtual viewpoint trajectory $P_{Tracked}$ corresponding to the real viewpoint trajectory $P_{original}$.

As described above, the virtual viewpoint trajectory generated based on the real viewpoint trajectory can be generated according to the realistic movement of the real camera, and thus it is not necessary to manually design the virtual viewpoint trajectory.

An offset may occur in the process of converting the real viewpoint trajectory into the virtual viewpoint trajectory, and since an image sequence according to the virtual viewpoint trajectory is rendered and generated according to a virtual camera pose, the image sequence can be composed of frame images that accurately match the virtual camera pose.

Accordingly, the virtual image sequence generated in this manner has ideal frame images corresponding to the real camera movement and thus is suitable for being used as a ground-truth (GT) serving as a benchmark.

Therefore, the sequence production application can easily create an ideal virtual image sequence to generate a benchmark dataset.

In addition, the sequence production application may reproduce the virtual image sequence generated in this manner through the sequence production application (S109).

The virtual image sequence may be input to the export part of FIG. 5 to be reproduced.

In addition, the sequence production application may generate a benchmark dataset by setting the generated virtual image sequence as a predetermined GT for the target object (S111).

Thereafter, the sequence production application may receive a real image sequence obtained by photographing and tracking a real object corresponding to the target object through various object tracking applications of various camera devices (S113).

The sequence production application may benchmark the received real image sequence and the predetermined GT to calculate the accuracy of the object tracking application of the camera device that has transmitted the real image sequence (S115).

In addition, the sequence production application may improve the object tracking performance by modifying algorithm parameters of the object tracking application through parameters such as the calculated accuracy or by modifying the target object itself.

The embodiments according to the present invention described above may be implemented in the form of program instructions that can be executed through various computer components and recorded in a computer-readable recording medium. The computer-readable recording medium may include program instructions, data files, data structures, and the like alone or in combination. The program instructions recorded in the computer-readable recording medium may be specially designed and configured for the present invention, or may be known and used by those skilled in the art of computer software. Examples of the computer-readable recording medium include a hard disk, magnetic media such as a floppy disc and a magnetic tape, optical recording media such as a CD-ROM and a DVD, magneto-optical media such as a floptical disk, and hardware devices specially configured to store and execute program instructions, such as a ROM, a RAM, and flash memory. Examples of program instructions include not only machine language code such as those generated by a compiler, but also high-level language code that can be executed by a computer using an interpreter or the like. A hardware device may be converted into one or more software modules to perform processing according to the present invention, and vice versa.

The specific implementations described in the present invention are only examples and do not limit the scope of the present invention. For brevity of the specification, descriptions of conventional electronic components, control systems, software, and other functional aspects of the systems may be omitted. In addition, connections of lines or connecting members between components shown in the drawings exemplify functional connections and/or physical or circuit connections, and in an actual device, may be represented as various functional connections, physical connections, or circuit connections that are replaceable or additional. Furthermore, unless there is a specific reference such as "essential" or "important", they may not be necessary components for the application of the present invention.

Although the present invention has been described in detail with reference to preferred embodiments of the present invention, those skilled in the art or those having ordinary knowledge in the art will appreciate that various modifications and variations of the present invention can be made without departing from the spirit and technical scope of the present invention described in the claims. Accordingly, the technical scope of the present invention should not be limited to the detailed description of the specification, but should be defined by the claims.

What is claimed is:

1. A camera motion estimation method for an augmented reality tracking algorithm performed by a sequence production application executed by a processor of a computing device, comprising:
   displaying a target object on a sequence production interface;
   setting a virtual viewpoint trajectory on the displayed target object;
   generating an image sequence by rendering images obtained when the target object is viewed along the set virtual viewpoint trajectory; and
   reproducing the generated image sequence,
   wherein the displaying the target object on the sequence production interface comprises determining the target object, which is a pre-designed three-dimensional (3D) model corresponding to a real object, according to a user input,
   further comprising setting the generated virtual image sequence as a predetermined ground-truth serving as a benchmark;
   receiving a real image sequence obtained by photographing and tracking a real object corresponding to the target object from an object tracking application of a terminal; and
   comparing the received real image sequence with the predetermined ground-truth to calculate an accuracy parameter of the object tracking application, and
   wherein the displaying the target object on the sequence production interface comprises:
   importing a pre-designed 3D model corresponding to the target object and placing the imported 3D model at an origin of 3D spatial coordinates.

2. The camera motion estimation method of claim 1, wherein the setting the virtual viewpoint trajectory on the displayed target object comprises:
   placing a virtual camera according to a user input through the sequence production interface;
   moving the placed virtual camera; and
   setting a trajectory of movement of the virtual camera as the virtual viewpoint trajectory.

3. The camera motion estimation method of claim 1, wherein the setting the virtual viewpoint trajectory on the displayed target object comprises:
   receiving a real viewpoint trajectory generated by photographing and tracking a real object from a camera device;
   generating a virtual viewpoint trajectory corresponding to the real viewpoint trajectory; and
   setting the generated virtual viewpoint trajectory as the virtual viewpoint trajectory for the target object.

4. The camera motion estimation method of claim 3, wherein the receiving the real viewpoint trajectory generated by photographing and tracking the real object from the camera device comprises:
   photographing the real object by the camera device while moving the camera device;
   calculating, by a real camera of the camera device, a pose value for the real object for each viewpoint at which the real object is photographed; and
   determining a real viewpoint trajectory including changes of the pose value of the real camera.

5. The camera motion estimation method of claim 4, wherein the generating the virtual viewpoint trajectory corresponding to the real viewpoint trajectory comprises converting the pose value of the real camera for the real object into a pose value of the virtual camera for the target object.

6. The camera motion estimation method of claim 1, wherein the generating the image sequence by rendering images obtained when the target object is viewed along the set virtual viewpoint trajectory comprises:
   moving the virtual camera along the virtual viewpoint trajectory; and
   generating a frame image by rendering a frame image obtained when the target object is viewed from a virtual camera pose at one viewpoint of the moving virtual camera.

7. The camera motion estimation method of claim 6, wherein the generating the image sequence by rendering images obtained when the target object is viewed along the set virtual viewpoint trajectory comprises matching a virtual camera pose value at the time of capturing each of the rendered frame images and the corresponding frame image and including the matched virtual camera pose value and the frame image in a virtual image sequence.

* * * * *